United States Patent
Herron et al.

(10) Patent No.: US 9,146,842 B2
(45) Date of Patent: Sep. 29, 2015

(54) TESTING COMPUTER-IMPLEMENTABLE INSTRUCTIONS

(71) Applicant: Yahoo! Inc., Sunnyvale, CA (US)

(72) Inventors: Jon Herron, Sunnyvale, CA (US); Bian Jiang, Sunnyvale, CA (US); Stephane Karoubi, Mountain View, CA (US); Xianzhe Ma, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 19 days.

(21) Appl. No.: 13/967,852

(22) Filed: Aug. 15, 2013

(65) Prior Publication Data

US 2015/0052500 A1   Feb. 19, 2015

(51) Int. Cl.
*G06F 9/44* (2006.01)
*G06F 11/36* (2006.01)

(52) U.S. Cl.
CPC ................................ *G06F 11/3672* (2013.01)

(58) Field of Classification Search
CPC .................................................. G06F 11/3688
See application file for complete search history.

(56) References Cited

U.S. PATENT DOCUMENTS

| | | | |
|---|---|---|---|
| 8,042,098 B2 * | 10/2011 | Do et al. | 717/123 |
| 2003/0097650 A1 * | 5/2003 | Bahrs et al. | 717/124 |
| 2009/0119650 A1 * | 5/2009 | Bhandari et al. | 717/133 |
| 2012/0174068 A1 * | 7/2012 | Gutfleisch et al. | 717/124 |
| 2014/0137086 A1 * | 5/2014 | Chamieh et al. | 717/139 |

* cited by examiner

*Primary Examiner* — Philip Wang
(74) *Attorney, Agent, or Firm* — Berkeley Law & Technology Group, LLP (57) ABSTRACT

Briefly, embodiments of methods or systems for testing software modules are disclosed.

16 Claims, 3 Drawing Sheets

TESTING COMPUTER-IMPLEMENTABLE INSTRUCTIONS

BACKGROUND

1. Field

This disclosure relates to testing computer-implementable instructions, such as software, using test stubs generated responsive to a parsing operation capable of being performed, for example, by a computing device.

2. Information

In a development environment, such as an environment in which units of computer implementable instructions are being generated, a developer may not only be responsible for preparing functional code, but may additionally be asked to generate at least a portion of a testing environment. In some instances, for example, a testing paradigm may result in a developer to preparing appropriately constrained variables and/or other parameters for testing, such as at least a majority of instructions that may comprise, for example, a module of a computer program. In a C++ development environment, for example, a code developer, or a developer of other types of computer-implementable instructions, may generate a segment of test code for a variety of methods that may comprise portions of class definitions that perform one or more functions to be executed by a computer. In some environments, generating appropriate code segments can consume an inordinate amount of time and may therefore significantly impact productivity of an entire development organization. This may result, at least in part, in increasing cost and/or time-to-market of computer implemented code modules for use in e-commerce, business computing systems, information retrieval engines, and so forth.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

Likewise, in this context, the terms "coupled," "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. Though it should be noted that this is merely an illustrative example and claimed subject matter is not limited to this example. Again, particular context of description or usage may provide helpful guidance regarding inferences to be drawn.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term "network device" refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform, and/or similar terms are used interchangeably. Similarly, the terms client, client device, client computing device, client computing platform, and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long-haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. In this context, the term "between" and/or similar terms are understood to include "among" if appropriate for the particular usage. Likewise, in this context, the terms "compatible with," "comply with" and/or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

A network may be very large, such as comprising thousands of nodes, millions of nodes, billions of nodes, or more, as examples. Media networks, such as the Yahoo!™ network, for example, may be increasingly seeking ways to attract users to their networks and/or to retain users within their networks for extended periods of time. A media network may, for example, comprise an Internet website or group of websites having one or more sections. For instance, the Yahoo!™ network includes websites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, if a user displays a page, perhaps as a result of utilizing a search engine, a server (or other source) located within or external to a processing and/or communications infrastructure of a media network may deliver relevant content, which may include, for example, textual and/or multimedia content that may entice users to remain for a relatively extended period of time. Access, such as links to content (e.g., such as hyperlinks to websites located outside of a media network), may also be presented to users. Thus, even if users are directed to websites outside of a particular media network, users may remain loyal to the media network in the future if they believe that the network consistently provides access, such as links, or otherwise directs them to relevant and/or useful content. In this context, the term "content" includes, as examples, images, video, audio, text, and/or multimedia, such in the form of stored physical (e.g., memory) states or in the form of electronic signals, for example.

As a non-limiting example, responsive to submitting a search query (e.g., terms that may be submitted to a search engine) for example, or as a result of any other type of user interaction with a client computing platform, for example, such as via a browser, a user may access one or more pages (e.g., web pages), for example. In an implementation, a "cookie" (e.g., for example, locally stored physical (e.g., memory) states capturing details regarding a website interaction) may be used to identify a client computing platform, including a computing device, to a server, for example. To perform a content retrieving operation for example, a server, for example, may perform one or more operations based, at least in part, on one or more modules of computer instructions. It is noted that the terms operation and function may be used interchangeably in this context. In embodiments, content retrieval operations may be implemented, for example, using computer-implementable instructions such as those from the "C" family of programming languages (e.g., C, C++, C-Object Processor, Objective-C, Small-C, and so forth). In other embodiments, computer implemented instructions may be implemented by programming languages not related to the "C" family of programming languages, such as Java (JavaScript, Java FX script, and so forth) as well as any other human-understandable set or group of computer instructions that may be read by a compiler and a linker, for example, and translated into machine code so that a computer processor, for example, may decode and execute the instructions in at least one embodiment.

In conventional development environments, in which modules of computer-implementable instructions may be specified and/or written, developers may employ an "inversion of control" paradigm in which a developer may inject values into dependencies of one or more computer-implementable instructions. In such a development environment, as an example a developer of particular computer-implementable functions may, for example, provide dependency injection commands in addition to preparing functional (e.g., "production") modules. In one possible example, if a function such as "get_license_plate_number" is undergoing test, a test module or segment of computer-implementable instructions may be generated to inject appropriate signals into dependencies of the get_license_plate_number function. In such an example, testing a get_license_plate_number function may involve, for example, compatibility testing with a variety of six-, seven-, and eight-character license plate numbers so that various formats of license plate numbers in, for example, the United States, may be tested for compatibility. In some instances, appropriate license plate values may comprise those in which a first set of three characters comprises a letter between A and Z followed by a second set of three numeric (e.g., 0-9) characters. In another instance, an appropriate license plate value may comprise those in which three letters between A and Z are followed four additional alphanumeric (A-Z or 0-9). Use of an inversion of control paradigm may introduce additional complexity in dependency injection, for example, if a "get_license_plate_number" function is involved in processing and/or managing motorcycle license plates, distributor license plates, exempt organization license plates, emergency license plates, and so forth.

In embodiments, a "function" may represent a reusable set of one or more computer-implementable instructions that may be called using a particular name. A function may be "parameterized" such that one or more arguments may be passed to the function. For example, the function $e^x$ may be characterized as $1+x+x^2/2+x^3/6+x^4/24+x^5/120+$ etc., in which argument "x" may be used to compute and return a value for a function $e^x$.

In one or more embodiments, a development environment that makes use of another approach other than an inversion of control methodology may be used. In embodiments, for example, developers may be capable of preparing computer-implementable instructions without being responsible for determining test conditions for a code module, for example. In certain embodiments, code modules may be tested without further involvement by developers. By permitting generation of one or more "test stubs" in a code-test environment, for example, wherein a test stub may be characterized as a function that returns a predetermined value, code testing may be performed in a code testing environment as opposed to a development environment. For example, a test stub for testing a call to a network may, for example, be adapted to return a particular string under some circumstances, and to return a different string under other circumstances. In embodiments, implementing a code-test environment, may involve one or more parsing operations that may be performed. In a parsing operation, one or more modules of computer-implementable instructions may be formally evaluated to determine constituent components of computer-implementable instructions.

In embodiments, constituent components of one or more modules of computer-implementable instructions may be arranged into a hierarchy known as a "parse tree" in which constituent components, and their dependencies, comprise a root node and various levels of branch nodes. A parse tree may, for example, correspond to a root node that represents a C++ "class definition" followed by nodes describing one or more definitions of functions that form the dependencies of the class definition. In certain embodiments, a "class definition" may be characterized as a high level descriptor, such as the contents of a header file, which may include a small number of implementation details or may include no implementation details at all. In one possible example, a C++ class definition "person" may be implemented using a string variable corresponding to a name and a whole number corresponding to an age. It should be noted that claimed subject matter is not limited to C++ implementations, but rather is intended to embrace all types of class definitions and/or descriptors that identify computer-implementable code modules and/or structures. It should also be noted, that parsing operations may result in a parse tree, but may also result in any other logical structure, such as a syntax tree, a constituency-type parse tree, etc., and claimed subject matter is not limited in this respect.

In one or more embodiments, object code representations of computer-implementable instructions may be linked to test stubs extracted from a test stub library. Object code representations may be detected by scanning, for example, a parse tree or other hierarchical structure responsive to a parsing operation. Accordingly, an inversion of control paradigm, in which a developer of computer implementable instructions may be responsible for dependency injection for functions of a C++ class definition, for example, may be replaced, at least in part, by a paradigm comprising insertion of test stubs extracted from a test stub library. In embodiments, dependencies may be injected by way of standardized test stubs generated in response to parsing of one or more modules of computer-implementable instructions. Use of standardized test stubs may also permit, for example, testing of constructs that may be more difficult to test, such as singletons, global functions, C macros, class methods, and library functions, just to name a few among many such constructs.

In embodiments, parsing may be at least partially similar to a compiling operation in that parsing and/or compiling operations may result in generation of object files representing methods of, for example, a C++ class definition. In certain embodiments, a parsing operation may give rise to generation of one or more test stubs, which may function to inject dependencies into functions of, for example, C++ class definitions. Thus, as previously pointed out, dependency injection may be accomplished through extraction of test stubs from a test stub library as opposed to reliance on a developer of the computer-implementable instructions. In one or more embodiments, an overarching integration system may form and/or construct a test complement, which may, for example, comprise one or more modules of computer-implementable instructions linked to one or more test stubs. It should be noted, however, that although particular programming languages, such as C++, have been described for the sake of example, other programming languages may be used, and claimed subject matter is not limited in this respect.

In one or more embodiments, a computing platform may comprise one or more computing devices to electronically generate at least one test stub to provide dependency injection for at least one external dependency of a module of computer-implementable instructions. The computing platform may electronically parse computer-implementable instructions and, responsive to a parsing process, determine at least one external dependency. In embodiments, a parser may detect presence of at least one function, method, or other component of a class definition, for example, from another module of computer-implementable instructions currently under test. For example, as will be seen in greater detail, an integration system may direct a test code generator to construct one or more test stubs from another module of computer-implementable instructions for use with dependency injection of a class definition.

In embodiments, if a test complement has been constructed by an integration system, for example, an integration system may prepare a listing for documenting results of executing tests on a test complement, for example. Results of test execution may enable a developer, for example, to detect components (e.g., functions and/or other components of a C++ class definition) that may be unstable and/or perform problematically. Responsive to review of test results, a developer may prepare an additional or second version of a module of computer-implementable instructions. A second version of a module of computer-implementable instructions may be parsed and merged with a parse tree from a previous parsing operation. A merged parse tree may be employed to construct an updated set of executable test complements. Results of executed test complements may be selectively updated in a manner that does not overwrite results from previous tests. In some embodiments, such selective updating may allow a developer to focus on results of updated portions of computer-implementable instructions without affecting results of test complements that do not represent updated computer-implementable instructions.

Figure 1:
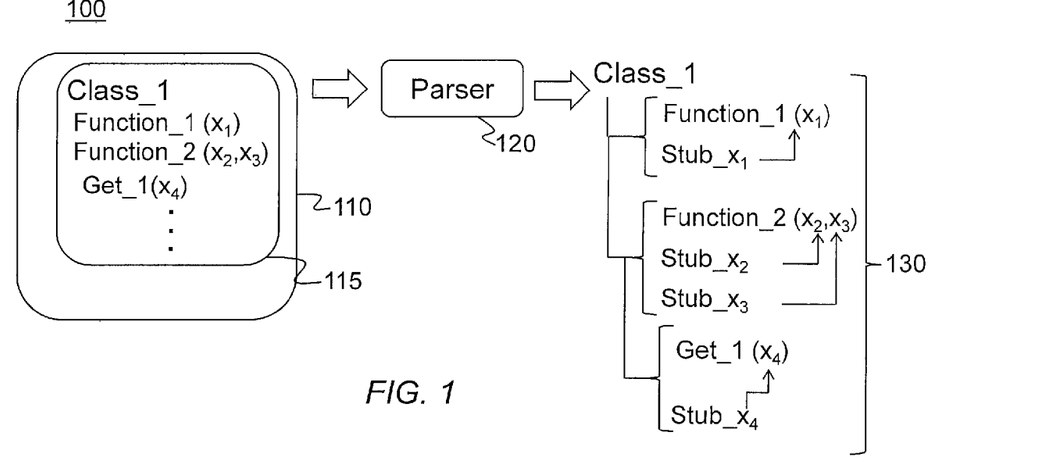
FIG. 1 is a flow diagram showing testing computer-implementable instructions according to an embodiment.

FIG. 1 is a flow diagram showing a system for testing computer-implementable instructions according to an embodiment 100. In FIG. 1, server 110 comprises a storage location wherein one or more modules of computer-implementable instructions may be stored. Server 110 may, in some embodiments, represent a group or a cluster of servers that may number into the dozens, hundreds, thousands, or more. It should be pointed out that throughout this document, groups or clusters of server devices may be employed, although a single server may be discussed. Server 110 of FIG. 1 includes computer-implementable instructions storage unit 115, which, for example, may comprise one or more computer-implementable instructions repositories which may include computer-implementable instructions for gathering publications for use by subscribers, selection of news articles, access to databases, on-demand videos of movies and/or television shows, tools for use with website development, just to name a few non-limiting examples.

Computer-implementable instructions storage unit 115 is illustrated as storing a class definition (class_1), which may be represented by text-type, for example, source code, and/or compiled binary files, followed by dependencies comprising two constituent components (function_1, function_2) having arguments $x_1$, and $x_2$, and $x_3$, respectively. In this context, an "argument" may be used to characterize one or more variables, for example, passed into a function. For example, an argument for the function sin(x) may be the variable "x." Class definition class_1 also comprises a dependency on the function get_1, which may operate using argument $x_4$. It should be noted that, again, although class definitions and functions may be described in the context of the C++ programming language, computer-implementable instructions stored in computer-implementable instructions repository 115 may comprise instructions from a large variety of programming languages, and claimed subject matter is not limited in this respect. Additionally, although FIG. 1 illustrates only a small number of functions of a single class definition, computer implementable instructions may number into the thousands or more, and claimed subject matter is not limited in this respect.

Server 110 may be communicatively coupled to parser 120, which may serve to parse modules comprising computer-implementable instructions from computer-implementable instructions storage unit 115. As described previously herein, parser 120 may serve to evaluating computer-implementable instructions to form a parse tree. In embodiments, parser 120 may operate in a manner that may be similar to a compiler in translating statements from higher-level computing language into constituent components such as, for example, object files. In embodiments, parser 120 may form a part of a compiler that parses an input stream. Results (e.g., generated output signals) of a parser might comprise, for example, identifying a start of the function, a function argument, an end of the function, an arithmetic operator, such as a "+" sign, and so forth. A compiler may access results of a parser to build a syntax tree, run optimizations, and/or generate machine code, for example. In FIG. 1, for example, precompiled, parsed components of class definition class__1 may be represented by a parse tree, such as parse tree 130, comprising a root node class__1 and having dependencies on function__1 and function__2, wherein function__2 is dependent on the function get__1.

In FIG. 1, test stubs $x_1$, $x_2$, $x_3$, and $x_4$ represent dependency injections into Function__1, Function__2, and the function get__4. In embodiments, test stubs, such as test stubs $x_1$, $x_2$, $x_3$, and $x_4$ provide appropriately constrained values from a test stub library as opposed to values that may be manually, for example, instantiated by a developer and injected during testing of one or more modules of computer-implementable instructions. Thus, if one or more of functions Function__1 and Function__2 represents a complex function, in which, for example, a large range of values may give rise to an error or result in an instability if the class definition "class__1" is executed by a processor, for example, test stubs may be modified so as to return properly constrained values under all or virtually all circumstances. In one possible example, proper constraining of a function may result in attempting to ensure that, under virtually all circumstances, a division by zero (1÷0) exception is made unlikely to occur. In embodiments, a single update, or other small number of updates or modifications to one or more of test stubs $x_1$, $x_2$, $x_3$, and $x_4$ associated with a library of functions, for example, may permit its use by a large number of modules of computer-implementable instructions in a variety of testing scenarios.

Figure 2:
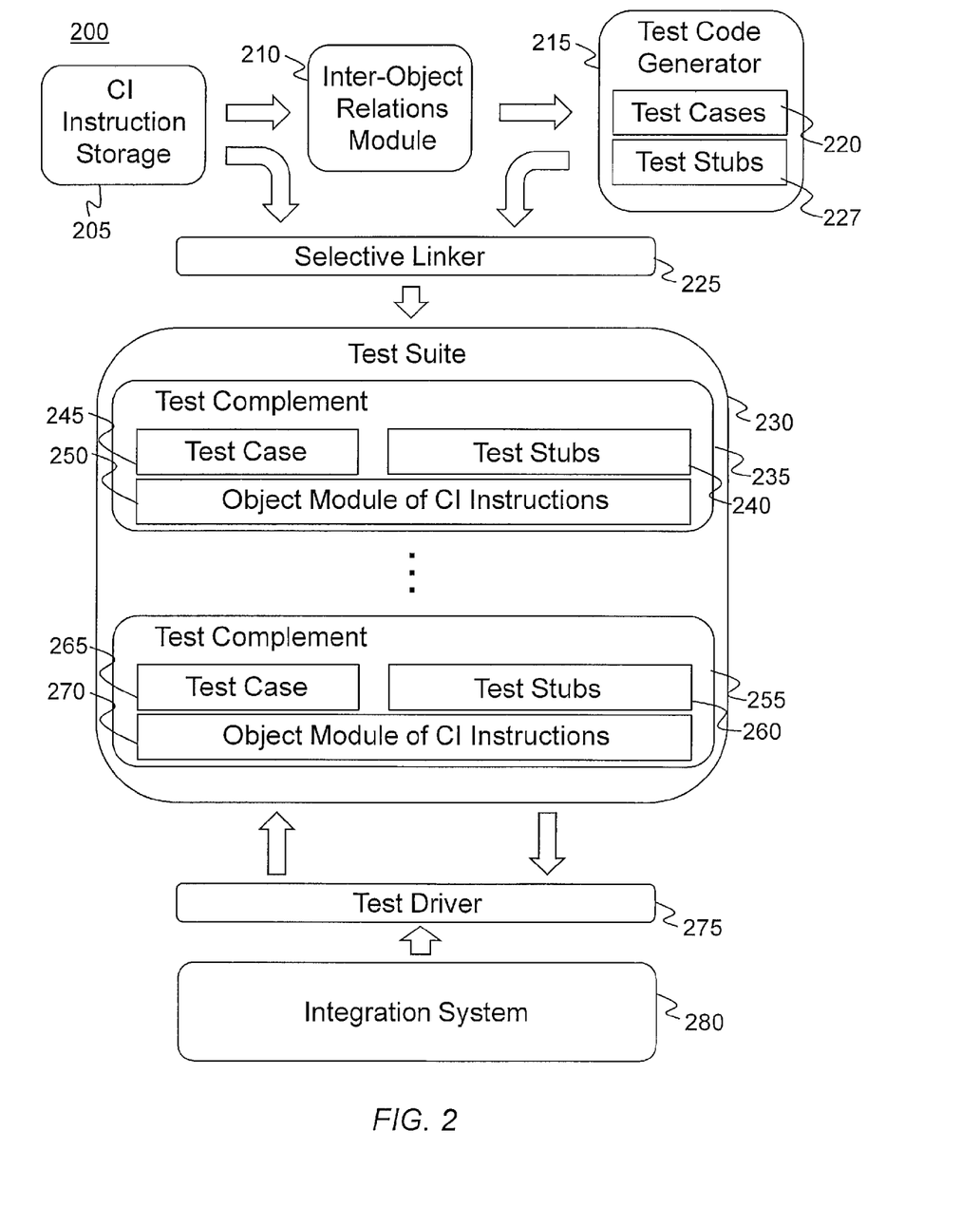
FIG. 2 is a flow diagram of an embodiment for testing computer implementable instructions.

FIG. 2 is a flow diagram of an embodiment 200 for testing computer implementable instructions. In one possible example to illustrate an embodiment, computer implementable (CI) instruction storage 205 may represent a group of one or more modules of computer-implementable instructions. Thus, CI instruction storage 205 may represent a repository that may store computer-implementable instructions for gathering publications for use by subscribers, selecting of news articles in response to user queries, providing access to databases, serving of on-demand videos of movies and/or television shows, and so forth, just to name a few non-limiting examples, and claimed subject matter is not so limited. Rather, claimed subject matter is intended to embrace repositories of all types that may store, or be capable of storing, computer-implementable instructions.

Output signals representing computer-implementable instructions from CI instruction storage 205 may be communicatively coupled to an input port of inter-object relations module 210. Inter-object relations module 210 may serve to detect, for example, functions comprising dependencies of class definitions if, for example, computer CI 205 comprises computer instructions written in C++. In other embodiments, inter-object relations module 210 may serve to detect inter-object relationships among other types of self-contained interchangeable units, components, elements, segments etc. of computer-implementable instructions of CI instruction storage 205, and claimed subject matter is not limited in this respect.

In embodiments, inter-object relations module 210 may parse one or more modules of computer-implementable instructions from CI instruction storage 205 to detect relationships among one or more class definitions, for example. In one possible example, just for the sake of illustration, CI instruction storage 205 may comprise class definitions, such as class definitions used in the C++ programming language (e.g., class__1, class__2, class__3, etc.), and class__1 comprises a method that receives an instance of class__2 and returns and instance of class 3. In such an example, inter-object relations module 210 may parse instructions from CI instruction storage 205 and initially detect dependency of class__1, such as on an output signal of a processor, for example, generating an instance of class__2. Accordingly, inter-object relations module 210 may proceed by generated a test stub that simulates an appropriately constrained output value (e.g., string, integer, whole number, array, or combinations thereof) returned by class__2 and for use by class__1. Thus, test code generator 215 may generate one or more of test cases 220 comprising an appropriately constrained instance of one or more of test stubs 227 representing a variable returned by class__2 for testing of class__1.

Extending the example above, inter-object relations module 210 may additionally detect that an output signal of a processor generating an instance of class__2 may result in an instance of class__3. In response, inter-object relations module 210 may generate a test stub that returns an appropriately constrained output value (e.g., string, integer, whole number, array, or any combination thereof) of class__1 for use by class__3. Thus, test code generator 215 may generate one or more of test cases 220 comprising an appropriately constrained instance of class__1 for testing of class__3. For example, appropriately constraining a value might involve, for example, attempting to ensure that a function that designed to operate with, for example, a string that is five bytes in length always or virtually always receives a string of five bytes.

Thus, for example, inter-object relations module 210 may interact with test code generator 215, for example, to generate numerous test cases 220 using test stubs 227, which may be extracted from a common test stub library. Further, also as illustrated above, testing of class definitions may be performed in a manner that considerably or even fully isolates testing of modules of computer-implementable instructions, such as class definitions used in a C++ programming environment. In many embodiments, this may permit testing at a granular level that facilitates troubleshooting at a low level in which results of discrete methods may be tested without cascading error conditions through complex and/or interdependent computer-implementable code structures. For example, for a given method, logic internal to a method may be tested. In one possible example, if a function assumes a first value if an argument equals zero and assumes a second value if an argument equals a nonzero number, both branches of the method may be tested. Selective linker 225 may receive different computer-implementable instructions translated, for example, from a higher-level programming language, such as one of the C family programming languages (e.g., C, C++, C-Sharp, etc.) and link the instructions these with one or more test stubs 227 as directed by test code generator 215. As explained in further detail with reference to FIG. 3, selective linker 225 may generate test suite 230, which may comprise executable test complements, such as test complement 235, test complement 255, and perhaps numerous others. A selective linker in this context differs from a conventional linker. A conventional linker is intended to link all object files generated during a compiling operation. Libraries called by various object files may also be linked using a conventional linker. A selective linker, rather than linking all object files generated during a compiling operation, links object files with test stubs.

In embodiments, test complements may comprise executable instructions that may be formed using test case identifiers, such as test case 245, 265, and so forth, which may represent one or more of test cases 220. Test complements may also comprise test stubs 240 and 260, which may represent one or more of test stubs 227, for example, and object modules of CI instructions 250 and 270, which may represent computer-implementable instructions represented as object files. It should be noted that selective linker 225 may link other components to form test complements, such as, for example, such as runtime libraries and/or other utilities that may permit test complement 235 to operate as a predominantly self-contained set of executable instructions and claimed subject matter is not limited in this respect.

Test complements 235 and 255 of test suite 230 may operate according to instructions from test driver 275, which may operate to schedule execution of test complements and, for example, aggregate results into a single report. In embodiments, reports may provide documentation of test cases that perform, for example, in a satisfactory manner, such as meeting requirements set forth in test requirements documents, for example. Reports may be analyzed by developers, for example, to detect programming errors (e.g., bugs) as well as to detect improperly constructed test stubs, incorrect linking, incompatibilities with runtime libraries, and so forth. In embodiments, a higher-level management system, such as integration system 280, may generate e-mails to developers, for example, and may provide additional automated reporting services.

In particular embodiments, integration system 280 may bring about selective execution of test complements in a manner that reduces risk of overwriting of test results of previous versions of computer-implementable instructions. For example, if an updated version of computer-implementable instructions results in changes to test complement 255 only (e.g., test complement 235 is unchanged from one or more previous versions) results of previous testing of test complement 235 may be unaffected by testing of an updated version. In embodiments, this may preserve results of previous testing of test complement 235 even if inter-object relations module 210 merges an updated parse tree with a parse tree generated from a previous version of computer-implementable instructions.

Figure 3:
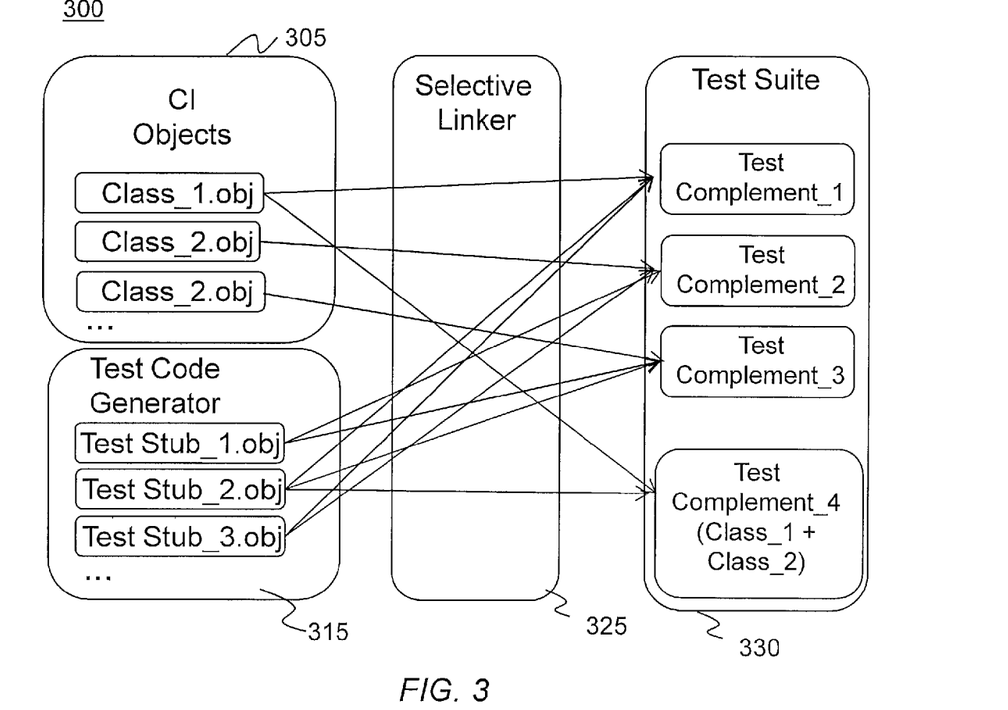
FIG. 3 provides additional detail of operations of FIG. 2 according to an embodiment.

FIG. 3 described herein, provides additional detail of operations of selective linker 225 of FIG. 2 according to an embodiment 300. In FIG. 3, class definitions from CI instruction storage 305 may be linked to appropriate test stubs from test code generator 315 through the actions of selective linker 325. Responsive to selective linking, test complements, shown within test suite 330, may be constructed. In the example of FIG. 3, test complement_1 may be seen as comprising one or more object files corresponding to class definition class_1.obj and object files test stub_2.obj and test stub_3.obj. Thus, in this example, object files corresponding to computer-implementable instructions may be linked with object files corresponding to test stubs to form test complement_1. Likewise, test complement_2 may comprise object files corresponding to computer-implementable instructions corresponding to class definition class_2.obj linked with object files corresponding to test stub_1.obj and test stub_3.obj. Similarly, test complement_3 may comprise object files corresponding to computer-implementable instructions corresponding to class definition class_2.obj linked with object files corresponding to test stub_1.obj and test stub_2.obj, for example.

FIG. 3 also illustrates test suite 330 as comprising test complement_4. As previously mentioned, an example for the sake of illustration may comprise an instance in which a class definition (e.g. class_1) comprises a method that receives an instance of class_2 and returns an instance of class_3. In such an instance, an inter-object relations module, such as inter-object relations module 210, may generate a test stub that simulates an appropriately constrained output value (e.g., string, integer, whole number, array, or any combination thereof) of class_2 for use by class_1. In such an example, test code generator 315 may make use of a mock version derived from, for example, class_2 for testing computer-implementable instructions of class_1.

Figure 4:
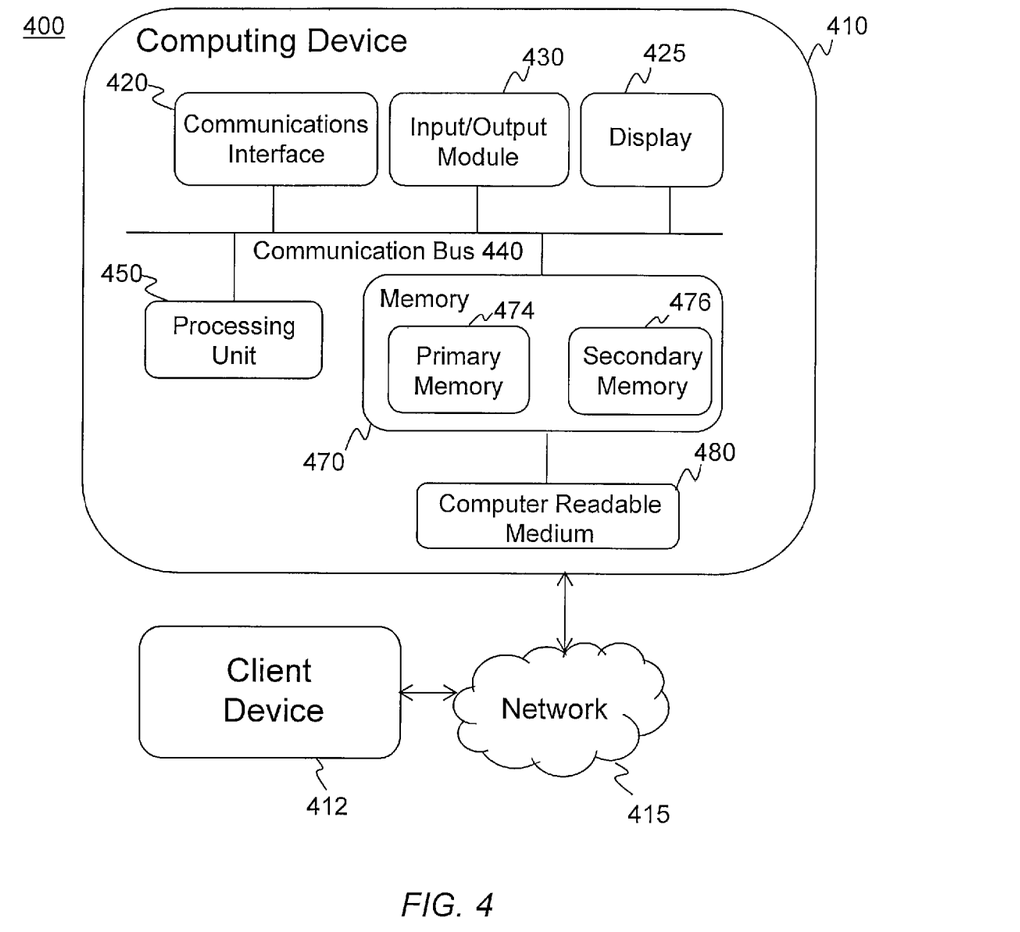
FIG. 4 is a schematic diagram of a computing platform that may be employed for testing computer-implementable instructions according to an embodiment.

For purposes of illustration, FIG. 4 is a schematic diagram 400 of a computing platform that may be employed for testing computer-implementable instructions according to an embodiment. The computing platform of FIG. 4 may comprise computing device 410 that may be employed to perform operations described herein. In FIG. 4, computing device 410 may interface with client device 412, which may comprise features of a conventional client device, for example. Communications interface 420, processor (e.g., processing unit) 450, and memory 470, which may comprise primary memory 474 and secondary memory 476, may communicate by way of communication bus 440, for example. In FIG. 4, computing device 410 may store various forms computer-implementable instructions, by way of input/output module 430, for example, such as those that direct operation of search engines, which may, for example, gather publications for use by subscribers, select of news articles, provide access to databases, serve on-demand videos of movies and/or television shows, etc. Client 412 may communicate with computing device 410 by way of an Internet connection via network 415, for example. Although the computing platform of FIG. 4 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 450 may be representative of one or more circuits, such as digital circuits, to perform at least a portion of a computing procedure or process. By way of example but not limitation, processor 450 may comprise one or more processors, such as controllers, microprocessors, microcontrollers, application specific integrated circuits, digital signal processors, programmable logic devices, field programmable gate arrays, and the like, or any combination thereof. In implementations, processor 450 may perform signal processing to manipulate signals or states or to construct signals or states, for example.

Memory 470 may be representative of any storage mechanism. Memory 470 may comprise, for example, primary memory 474 and secondary memory 476, additional memory circuits, mechanisms, or combinations thereof may be used. Memory 470 may comprise, for example, random access memory, read only memory, or one or more data storage devices or systems, such as, for example, a disk drive, an optical disc drive, a tape drive, a solid-state memory drive, just to name a few examples. Memory 470 may be utilized to store a program, as an example. Memory 470 may also comprise a memory controller for accessing computer readable-medium 480 that may parse, compile, link, and/or execute test complements of computer-implementable instructions and, for example, runtime libraries. Test complements comprising predominantly executable files may execute by way of processor 450 or some other controller or processor capable of executing instructions, for example. Under the direction of processor 450, memory, such as cells storing physical states, representing for example, a program, may be executed by processor 450 and generated signals may be transmitted via the Internet, for example. Processor 450 may also receive digitally encoded signals from computing device 410.

Network 415 may comprise one or more communication links, processes, and/or resources to support exchanging communication signals between a client and server, which may, for example, comprise one or more servers (not shown). By way of example, but not limitation, network 415 may comprise wireless and/or wired communication links, telephone or telecommunications systems, Wi-Fi networks, WiMAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing platform 410, as depicted in FIG. 4, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 470 may store cookies relating to one or more users and may also comprise a computer-readable medium that may carry and/or make accessible content, code and/or instructions, for example, executable by processor 450 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. A computing platform, comprising:
one or more computing devices to:
generate physical signals and/or physical states representing at least one test stub to provide dependency injection for at least one external dependency of one or more software modules, said at least one external dependency being determined by electronically parsing said one or more software modules;
construct a test complement comprising at least one instruction of said one or more software modules translated into an object code;
link said object code to said at least one generated test stub; and
selectively update said test complement based, at least in part, on a merging of a parse tree of a first version of said one or more software modules and a parse tree of a second version of said one or more software modules.

2. The computing platform of claim 1, wherein said one or more software modules comprise one or more modules of computer-implementable instructions.

3. The computing platform of claim 1, wherein said physical signals comprise electrical signals.

4. The computing platform of claim 1, wherein said one or more computing devices are additionally to:
generate a parse tree representing at least a portion of said one or more software modules.

5. The computing platform of claim 1, wherein said one or more computing devices are additionally to:
detect at least one function having said at least one external dependency, wherein said at least one test stub returns one or more values constrained to accord with an expected return of said at least one function.

6. The computing platform of claim 1, wherein said one or more computing devices are additionally to:
detect dependency of a first module of said one or more software modules on a second module of said one or more software modules.

7. A method comprising:
generating electronic signals that result, at least in part, in parsing one or more modules of computer-implementable instructions;
determining that said one or more modules of said computer-implementable instructions includes at least one external dependency;
generating at least one test stub to inject one or more values to said at least one external dependency; and
selectively executing, by one or more processors, one or more test complements based, at least in part, on a merging of a parse tree of a first version of said one or more modules of said computer-implementable instructions and a parse tree of a second version of said one or more modules of said computer-implementable instructions.

8. The method of claim 7, further comprising:
forming a parse tree as a result of said parsing.

9. The method of claim 7, further comprising:
determining a dependency of a first of said one or more modules of said computer-implementable instructions on a second module of said one or more modules of said computer-implementable instructions.

10. The method of claim 7, further comprising:
linking said at least one test stub to at least one of said one or more modules of said computer-implementable instructions to form a test complement.

11. The method of claim 7, further comprising:
generating at least one additional test stub for dependency injection for compiled object instructions representing a first module of said one or more modules of said computer-implementable instructions, said at least one additional test stub being derived from a second module of said one or more modules of said computer-implementable instructions.

12. An article comprising:
a non-transitory storage medium comprising machine-readable instructions stored thereon which are executed by a special-purpose computing apparatus to:
parse one or more modules of computer-implementable instructions to form a parse tree;
determine that at least a portion of said one or more modules of computer-implementable instructions comprises at least one external dependency;
generate one or more test stubs to return one or more appropriately constrained values to said one or more modules of said computer-implementable instructions; and
selectively update one or more test complements based, at least in part, on a merging of a parse tree of a first version of said one or more modules of said computer-implementable instructions and a parse tree of a second version of said one or more modules of said computer-implementable instructions.

13. The article of claim 12, wherein said non-transitory storage medium additionally comprises machine-readable instructions which are additionally to:
form a test complement comprising an object file representing said at least a portion of said one or more modules of computer-implementable instructions, said object file being linked to said one or more test stubs.

14. The article of claim 12, wherein said non-transitory storage medium additionally comprises machine-readable instructions which are additionally to:
link an object file representing at least a portion of said one or more modules of said computer-implementable instructions to an object file representing said one or more test stubs.

15. The article of claim 12, wherein said non-transitory storage medium additionally comprises machine-readable instructions which are additionally to:
detect dependency of a first module of said one or more modules of said computer-implementable instructions on a second module of said one or more modules of said computer-implementable instructions.

16. The article of claim 12, wherein said non-transitory storage medium additionally comprises machine-readable instructions which are additionally to:
    detect at least one function having said at least one external dependency, wherein said one or more test stubs returns one or more values constrained to accord with an expected return of said at least one function.

\* \* \* \* \*